US005689171A

United States Patent [19]
Ludewig

[11] Patent Number: 5,689,171
[45] Date of Patent: Nov. 18, 1997

[54] BATTERY CHARGER

[75] Inventor: Christopher J. Ludewig, Northfield, Minn.

[73] Assignee: E.F. Johnson Company, Burnsville, Minn.

[21] Appl. No.: 426,229

[22] Filed: Apr. 21, 1995

[51] Int. Cl.⁶ .................................................. H02M 10/46
[52] U.S. Cl. ................................ 320/2; D13/107; 429/99
[58] Field of Search ............................ 320/2, 5; 429/96, 429/97, 98, 99, 100; D13/103, 107, 108; 307/150

[56] References Cited

U.S. PATENT DOCUMENTS

| | | |
|---|---|---|
| D. 277,662 | 2/1985 | Huntington et al. . |
| D. 316,857 | 5/1991 | Park .................................... D14/138 |
| D. 327,247 | 6/1992 | Higuchi et al. . |
| 4,101,818 | 7/1978 | Kelly, III et al. ........................ 320/2 |
| 4,214,197 | 7/1980 | Mann et al. . |
| 4,232,260 | 11/1980 | Lambkin ................................ 320/2 |
| 4,303,876 | 12/1981 | Kelly, III et al. ...................... 320/2 |
| 4,403,182 | 9/1983 | Yeh ........................................ 320/2 |
| 4,532,194 | 7/1985 | Liautaud et al. ..................... 429/99 |
| 4,673,861 | 6/1987 | Dubovsky et al. . |
| 4,684,870 | 8/1987 | George et al. . |
| 4,734,049 | 3/1988 | George et al. . |
| 4,816,735 | 3/1989 | Cook et al. ............................ 320/2 |
| 4,829,224 | 5/1989 | Gandelman et al. . |
| 5,046,131 | 9/1991 | Takahashi et al. . |
| 5,059,885 | 10/1991 | Weiss et al. . |
| 5,136,229 | 8/1992 | Galvin . |
| 5,155,860 | 10/1992 | McClure . |
| 5,189,358 | 2/1993 | Tomura et al. ....................... 320/2 |
| 5,241,592 | 8/1993 | Carlson et al. ..................... 379/433 |
| 5,254,931 | 10/1993 | Martensson . |
| 5,314,763 | 5/1994 | Aksoy et al. . |
| 5,317,247 | 5/1994 | Chong et al. . |
| 5,327,067 | 7/1994 | Scholder ............................... 320/2 |

OTHER PUBLICATIONS

Motorola, Inc., "Micro T.A.C. Lite Digital Personal Communicator", *Owners Manual*, (Apr. 1992).

Tandy Corporation, "DUoFane Cordless Electronic Telephone", *Owner's Manual ET–415, CAT. No. 43–555*, (1984).

*Primary Examiner*—Edward Tso
*Attorney, Agent, or Firm*—Schwegman, Lundberg, Woessner & Kluth, P.A.

[57] ABSTRACT

A battery charger designed for use with a portable battery powered device. The battery charger has a housing and two battery charger ports defined therein, each of the battery charger ports have a first open end at the surface of the housing and a second closed end. The battery charger ports include at least two sets of spaced apart battery engaging electrodes disposed therein. The second closed end of the first charging port has a stepped configuration that defines a first step adapted to receive and hold a first selected battery in electrical contact with a first set of electrodes and a second step adapted to receive and hold a second selected battery in electrical contact with a second set of electrodes. The second closed end of the second charging port has a stepped configuration that defines a first step adapted to receive and hold a first selected battery having a battery powered device mated thereto in electrical contact with a first set of electrodes and a second step adapted to receive and hold a second selected battery having the battery powered device mated thereto in electrical contact with a second set of electrodes.

11 Claims, 3 Drawing Sheets

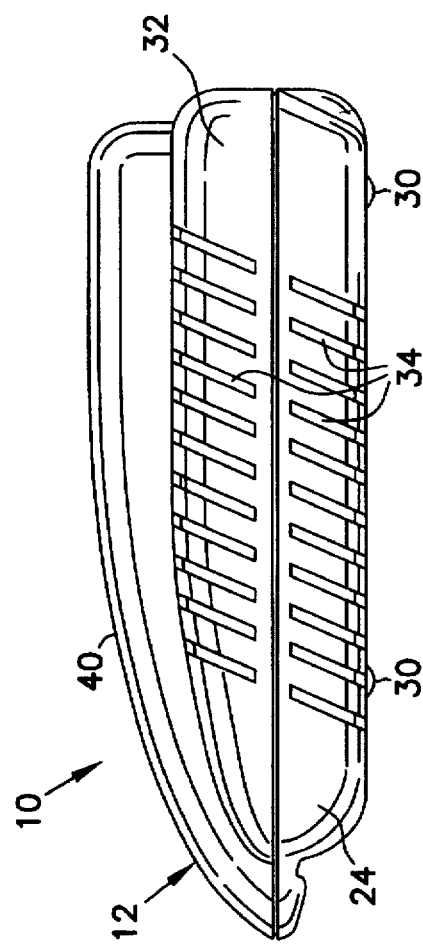
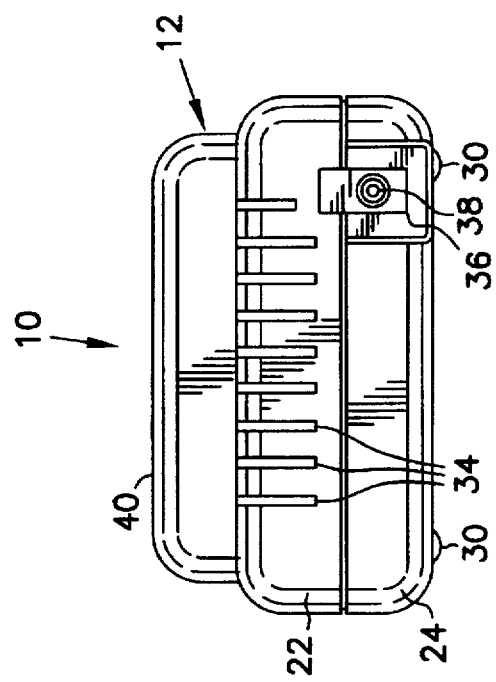
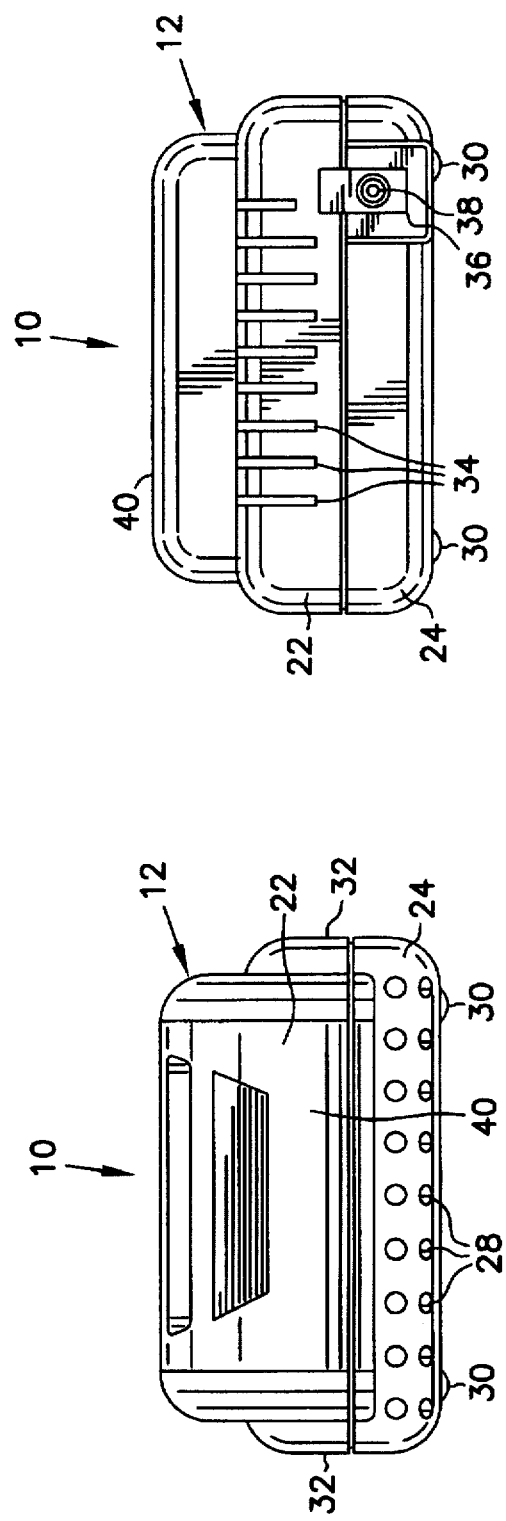

BATTERY CHARGER

TECHNICAL FIELD

The present invention relates to a device useful for recharging batteries used to power portable battery powered devices, such as radiotelephones and the like. More particularly, the battery charger of the present invention is capable of recharging selected batteries of varying dimensions singly or when mated with the battery powered device with which the battery is commonly utilized.

BACKGROUND OF THE INVENTION

There is a need in the industry today to provide a single battery charger with a battery powered device that would provide the widest versatility possible in recharging the battery contained within a battery pack. Many battery powered devices are provided with several battery packs. The battery packs may be of varying charge capacity and are consequently of different physical size. A single battery powered device may then be provided with both a relatively large battery pack containing a relatively large battery and a relatively small battery pack containing a battery of somewhat lesser capacity. A user may find it convenient to use a smaller battery pack when the battery powered device must be carried on the person in a business environment when it is desired that the battery powered device be the least obtrusive as possible. The larger capacity battery, also being of larger physical size, may be used with the battery powered device for an extensive trip in a vehicle when the larger charge capacity is required and a relatively large size of the battery powered device combined with the battery pack is not of great importance. In order to maximize versatility, it is desirable that a single battery charger be able to recharge the small battery alone, the large battery alone, the small battery when mated to the battery powered device, and the large battery when mated to the battery powered device. Additionally, it is desirable to minimize the size of the battery charger.

SUMMARY OF THE INVENTION

The present invention substantially meets the aforementioned needs. The battery charger of the present invention has two charging ports. A first charging port is adapted to charge either a small or a large battery when the batteries are mated to the battery powered device. A second charging port is adapted to charge either a large or a small battery alone. By using only two charging ports to charge four different configurations of the battery and battery powered device, the overall size of the battery charger is minimized.

The battery charger is designed for use with a portable battery powered device. The battery charger has a housing and two battery charger ports defined therein, each of the battery charger ports have a first open end at the surface of the housing and a second closed end. The battery charger ports include at least two sets of spaced apart battery engaging electrodes disposed therein. The second closed end of the first charging port has a stepped configuration that defines a first step adapted to receive and hold a first selected battery in electrical contact with a first set of electrodes and a second step adapted to receive and hold a second selected battery in electrical contact with a second set of electrodes. The second closed end of the second charging port has a stepped configuration that defines a first step adapted to receive and hold a first selected battery having a battery powered device mated thereto in electrical contact with a first set of electrodes and a second step adapted to receive and hold a second selected battery having the battery powered device mated thereto in electrical contact with a second set of electrodes.

BRIEF DESCRIPTION OF THE DRAWINGS

FIG. 2 is a side elevational view of the battery charger;

FIG. 3 is a front elevational view of the battery charger;

FIG. 4 is a rear elevational view of the battery charger;

DETAILED DESCRIPTION OF THE DRAWINGS

Figure 1:
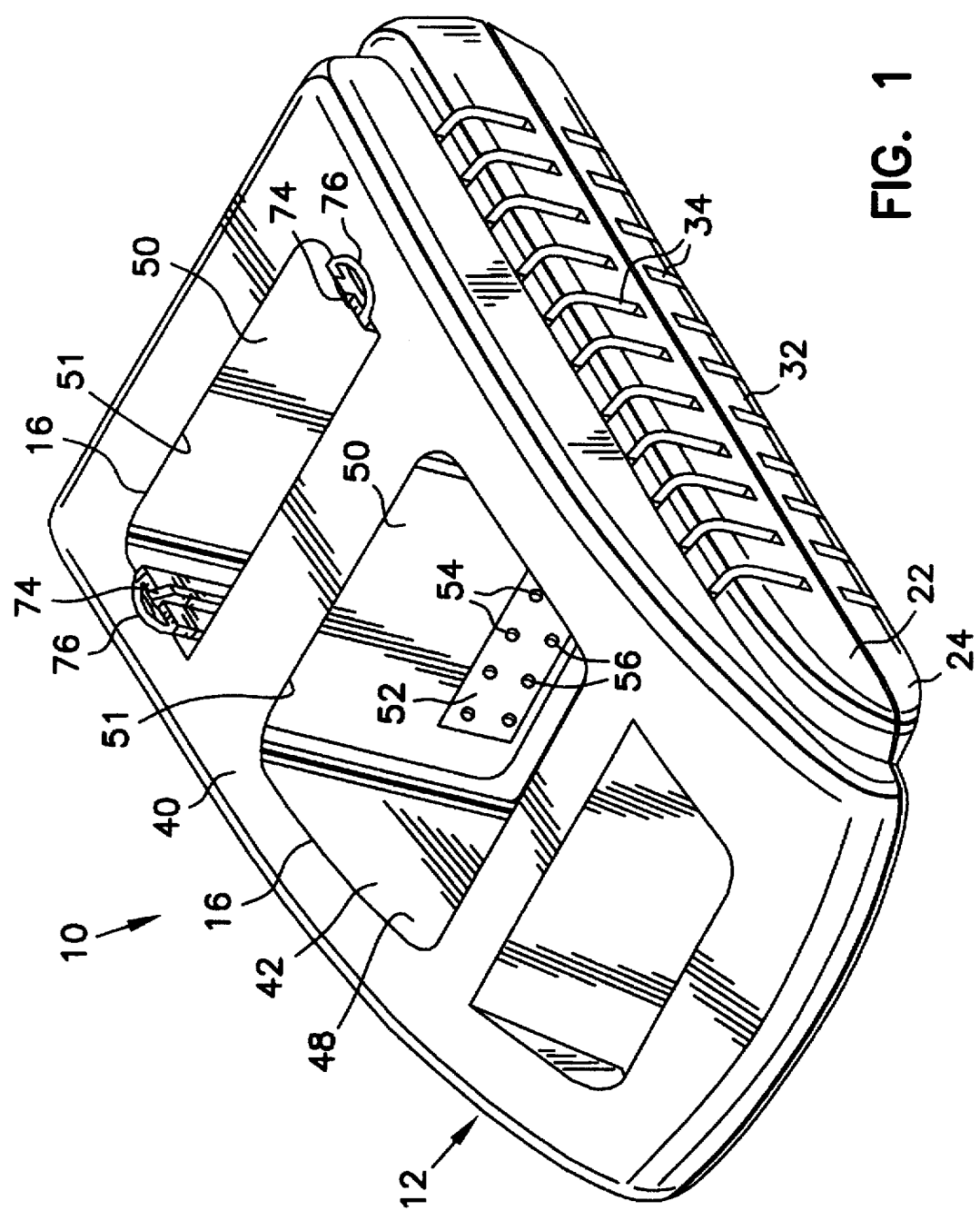
FIG. 1 is a perspective view of the battery charger of the present invention.

The battery charger of the present invention is shown generally at 10 in FIGS. 1-5. The battery charger 10 has three major subcomponents: housing 12, charging components 14, and charger ports 16.

The housing 12 preferably formed of a ABS type plastic material. The housing 12 is comprised of an upper housing 22 mated to a lower housing 24. Latches (not shown) are formed proximate the lower margin of the upper housing 22 and proximate the upper margin of the lower housing 24, which latches are adapted to mate and engage the upper housing 22 to the lower housing 24.

The bottom surface 26 of housing 12 has a plurality of air circulation holes 28 formed therein. The bottom surface 26 is held spaced apart from the surface upon which the battery charger 10 rests by feet 30 and is designed to be generally parallel to such surface. The side surfaces 32 and rear surface 33 of the housing 12 have a plurality of air circulation slits 34 defined therein, as depicted in FIGS. 2 and 4.

As depicted in FIG. 4, a power connector 36 is provided in a rear surface 33 of the housing 12. The power connector 36 is comprised of a pair of concentric electrodes 38. Concentric electrodes 38 are adapted to be mated with the output connector of a DC transformer, for providing electrical power to the battery charger 10. The power connector 36 is electrically connected to the charging components 14 disposed within the housing 12.

The battery charger 10 has an upper surface 40 that preferably slopes gently downward from the rear of the battery charger 10 to the front thereof. This sloping is apparent in FIGS. 1, 2 and 5.

Figures 5, 6:
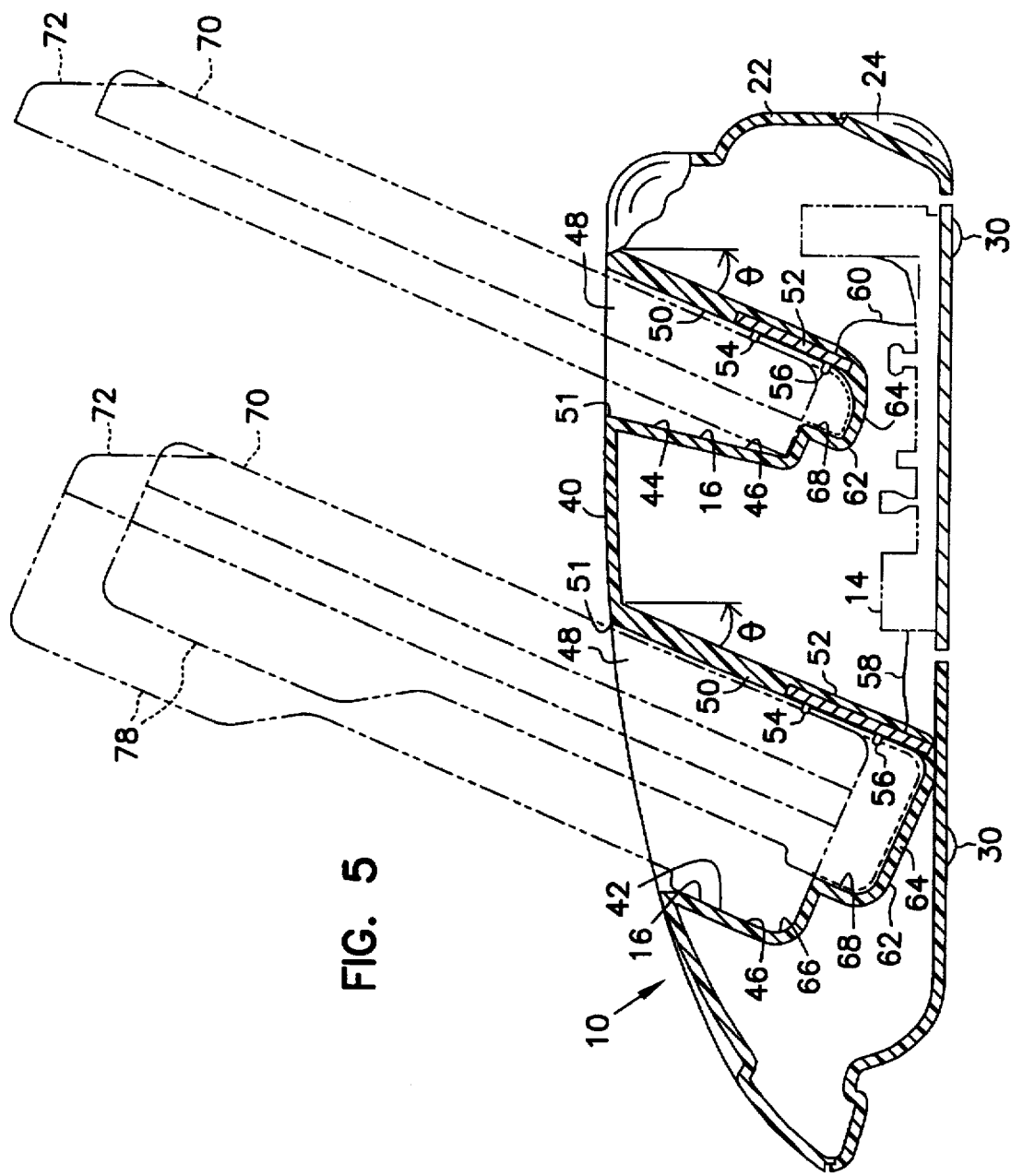
FIG. 5 is a side elevational view of the battery charger with portions broken away showing in phantom the battery powered device mated to a large battery and a small battery being charged in a front charging port and depicted in phantom a large and small battery being charged in the rear charging port.
FIG. 6 is an end elevational view of the battery retainer as used in the rear charger port.

Two charger ports 16 are defined in the upper surface 40 of the battery charger 10: front charger port 42 and rear charger port 44. As depicted in FIGS. 1 and 5, each charger port 16 has a front wall 46, opposed side walls 48, and a rear wall 50. The upper margin of the walls 46, 48, and 50 at the point of intersection with the upper surface 40 define a port opening 51 in the upper surface 40. The opposed side walls 48 are preferably generally parallel to one another. The front wall 46 and the rear wall 50 preferably diverge from one another such that the front wall 46 and the rear wall 50 are closer together in the recess of the charger ports 16 than at the port opening 51.

The two charger ports 16 are oriented within the housing 12 at an angle theta with respect to the vertical when the battery charger 10 is positioned on a horizontal surface, as depicted in FIG. 5. The angle theta for both charger ports 16 is preferably approximately thirty degrees, but other angles may also be used.

An electrode pad 52 is disposed proximate the lower margin of the rear walls 50 of both the front charger port 42 and the rear charger port 44. Each electrode pad 52 has a first upper set of electrodes 54 and a second lower set of electrodes 56, spaced apart therefrom. In the preferred embodiment, each set of electrodes 54, 56 is comprised of four separate pin type electrodes as depicted in FIG. 1. The electrode pad 52 in the front charger port 42 is connected by wire 58 to the charging components 14. The electrode pad 52 in the rear charger port 44 is connected by wire 60 to the charging components 14.

Each of the charger ports 16 has a stepped bottom 62 that is fixedly connected to the lower margins of the front wall 46, side walls 48, and rear wall 50 thereof. Each of the stepped bottoms 62 has a first step 64, defining the deepest recess of the charger port 16, and a second step 66. The first step 64 and the second step 66 are connected by a step juncture 68.

The rear charger port 44 is adapted to charge either a small battery 70 or a large battery 72, as depicted in phantom in FIG. 5. Generally, portions of the front wall 46, the side walls 48 and the rear wall are designed to conform to the exterior surface of the batteries 70, 72. The large battery 72 is generally the same length and width dimensions as the small battery 70 but has a greater depth dimension and is received and supported by a substantial portion of the full wall dimensions of the rear charger port 44. The small battery 70 is therefore supported by portions of the side walls 48 and the rear wall 50 of the rear charger port 44, but not any portion of the front wall 46 thereof. In order to provide the support that the front wall 46 would otherwise provide, a battery retainer 74 is provided to compressively engage the upper side corners of the small battery 70, as depicted in FIGS. 5 and 6.

The battery retainer 74 is preferably formed of a relatively soft, deformable, resilient rubber material. The battery retainer 74 is formed in an elongate strip, having a generally T shaped cross section, as depicted in FIG. 6. The battery retainer 74 is carried in a retainer slot 76 disposed in each of the side walls 48 of the rear charger port 44. The retainer slot 76 captures the cross portion of the T shaped battery retainer 74, with the base of the battery retainer 74 projecting into the interior of the rear charger port 44 to engage the upper side corners of the small battery 70. The top of the T shaped battery retainer 74 has a pronounced curved shape. The curved shape accommodates the compression of the battery retainer 74 into the retainer slot 76 as desired.

As depicted in FIG. 5, the front charger port 42 is adapted to recharge either a small battery 70 or a large battery 72 when mated to a battery powered device 74. The front wall 46, side walls 48 and rear wall 50 of the charger port 16 are designed to conform to a portion of the exterior surface of the batteries 70, 72 and the battery powered device 78 when disposed within the front charger port 42.

In operation, the battery charger 10 is electrically connected to a source of electrical power by means of the power connector 36. The electrical power energizes the charging components 14 and the first and second set of electrodes 54, 56 of both the charger ports 16.

In order to charge a small battery 70, the small battery 70 is slid into the rear charger port 44, restrained between the battery retainer 74 and the rear wall 50. The depth dimension of the small battery 70 is slightly less than the width of the first step 64 of the stepped bottom 62. Accordingly, the small battery 70 will progress into the lowest recess of the rear charger port 44, defined by the first step 64 of the stepped bottom 62. Due to the sloped relationship of the rear charger port 44 with relation to the battery charger 10 as defined by the angle theta, a moment is generated by weight of the small battery 70 that causes the lower most upper surface thereof to bear against the surface of the step juncture 68. Simultaneously, the moment urges the small battery 70 into electrical contact with the second set of electrodes 56 disposed in the rear charger port 44.

In order to charge a large battery 72, the large battery 72 is slid into the rear charger port 44, restrained between the front wall 46 and the rear wall 50. The battery retainers 74 are compressed into the retainer slot 76 as the large battery 72 is progressed into the rear charger port 44. The large battery 72 will progress into the rear charger port 44, only as far as the second step 66 of the stepped bottom 62 as a result of the greater depth dimension of the large battery 72 as compared to the depth dimension of the small battery 70. The furthest recess of the rear charger port 44 that is defined by the first step 64 is not occupied by the large battery 72, when the large battery 72 is in place to be recharged. Due to the sloped relationship of the rear charger port 44 with relation to the battery charger 10 as defined by the angle theta, a moment is generated by the weight of the large battery 72 that causes the lower most portion of the upper surface thereof to bear against the surface of the front wall 46. Simultaneously, the moment urges the large battery 72 into electrical contact with the first set of electrodes 54 disposed in the rear charger port 44.

In order to charge a small battery 70 when mated to a battery powered device 78, the small battery 70 and the battery powered device 78 are slid into the front charger port 46. The depth dimension of the small battery 70 when mated to a battery powered device 78 is slightly less than the width of the first step 64 of the stepped bottom 62. Accordingly, the small battery 70 and the battery powered device 78 will progress into the lowest recess of the front charger port 46, defined by the first step 64 of the stepped bottom 62. Due to the sloped relationship of the rear charger port 44 with relation to the battery charger 10 as defined by the angle theta, a moment is generated by weight of the small battery 70 and the battery powered device 78 that causes the lower most upper surface of the battery powered device 78 to bear against the surface of the step juncture 68. Simultaneously, the moment urges the small battery 70 into electrical contact with the second set of electrodes 56 disposed in the front charger port 46.

In order to charge a large battery 72 when mated to a battery powered device 78, the large battery 72 and the battery powered device 78 are slid into the front charger port 46, restrained between the front wall 46 and the rear wall 50 thereof. The large battery 72 and the battery powered device 78 will progress into the front charger port 44 only as far as the second step 66 of the stepped bottom 62, as a result of the greater depth dimension of the large battery 72 and the battery powered device 78 as compared to the depth dimension of the small battery 70 and the battery powered device 78. The furthest recess of the rear charger port 44 that is defined by the first step 64 is not occupied by the large battery 72 and the battery powered device 78, when the large battery 72 is in place to be recharged. Due to the sloped relationship of the rear charger port 44 with relation to the battery charger 10 as defined by the angle theta, a moment is generated by the weight of the large battery 72 and the battery powered device 78 that causes the lowermost portion of the upper surface of the battery powered device 78 to bear against the surface of the front wall 46. Simultaneously, the moment urges the large battery 72 into electrical contact with the first set of electrodes 54 disposed in the front charger port 46.

While the invention has been particularly shown and described referenced to several preferred embodiments thereof, it will be understood by those skilled in the art that various changes in form and detail may be made without departing from the spirit or scope of the invention.

What is claimed is:

1. A battery charger for use with a portable battery powered device having a housing and two battery charger ports defined therein, each of said battery charger ports having a first open end at a surface of the housing and a second closed end within the housing and including at least two sets of spaced apart battery engaging electrodes disposed therein, the second closed end of a first charging port having a stepped configuration defining a plurality of steps adapted to receive and hold selected batteries having dimensional differences in electrical contact with a set of electrodes as a function of the dimensional differences thereof, the second closed end of a second charging port having a stepped configuration defining a plurality of steps adapted to receive and hold selected batteries having dimensional differences and having a selected battery powered device mated thereto in electrical contact with a set of electrodes as a function of the dimensional differences thereof.

2. A battery charger having a housing with at least two charger ports defined therein each of said charger ports having two sets of electrodes disposed therein, a first charger port being adapted to selectively receive and support a selected battery in electrical contact with a first set of electrodes and to receive and support a second battery being dimensionally different from the first battery in contact with a second set of electrodes and a second charger port being adapted to selectively receive and support a selected battery being mated to a battery powered device in electrical contact with a first set of electrodes and to receive and support a second battery, being dimensionally different from the first battery and being mated to the battery powered device, in contact with a second set of electrodes.

3. A battery charger as claimed in claim 2, the first charger port having a wall conforming to a portion of the exterior surface of the selected battery and to the selected dimensionally different battery, the top margin of the wall defining an opening in a surface of the battery charger housing and the bottom margin of the wall fixedly coupled to a step shaped bottom portion, and the second charger port having a wall conforming to a portion of the exterior surface of the selected battery mated to the battery powered device and to the selected dimensionally different battery mated to the battery powered device, the top margin of the wall defining a port opening in a surface of the battery charger housing and the bottom margin of the wall fixedly coupled to a step shaped bottom portion.

4. A battery charger as claimed in claim 3, wherein the step shaped bottom portion of the first charger port has two steps, a first step defining a charger port recess of selected depth adapted for receiving the battery and a second step defining a charger port recess having a selected depth that is less than the recess depth of the first step and is adapted for receiving the dimensionally different battery and the step shaped bottom portion of the second charger port has two steps, a first step defining a charger port recess of selected depth adapted for receiving the battery mated to the battery powered device and a second step defining a charger port recess having a selected depth that is less than the recess depth of the first step and is adapted for receiving the dimensionally different battery mated to the battery powered device.

5. A battery charger for charging the battery of a battery powered device, the battery being disposed within a battery pack, the battery charger being adapted to charge the battery when the battery pack is mated to the battery powered device and when the battery pack is disengaged therefrom, comprising:

a housing having charging components disposed therein;

a first charging port defined in the housing and having at least two sets of electrodes disposed therein, the electrodes being electrically coupled to the charging components, and being adapted to receive and support a plurality of selected dimensionally different battery packs in contact with a selected set of electrodes as a function of the dimensional differences thereof; and a second charging port defined in the housing and having at least two sets of electrodes disposed therein, the electrodes being electrically coupled to the charging components, and being adapted to receive and support a plurality of selected dimensionally different battery packs mated to a selected battery powered device in contact with a selected set of electrodes as a function of the dimensional differences thereof.

6. A battery charger as claimed in claim 5 wherein the first charging port includes wall members and a stepped bottom member having two steps, the first step adapted for receiving and supporting the first selected battery pack and the second step adapted for receiving and supporting the second selected battery pack, and the second charging port includes wall members and a stepped bottom member having two steps, the first step adapted for receiving and supporting the first selected battery pack mated to the selected battery powered device and the second step adapted for receiving and supporting the second selected battery pack mated to the selected battery powered device.

7. A battery charger for battery packs, the battery charger comprising:

a housing containing electrical charging components therein, the housing having an outer surface;

a first opening in the outer surface defining a first charger port terminating at a first closed end within the housing;

a first wall extending between the first opening and the first closed end, the first wall having a first step formed thereon between the first opening and the first closed end;

first upper electrodes disposed on the first wall between the first opening and the first step and connected to the electrical charging components, and first lower electrodes disposed on the first wall between the first step and the first closed end and connected to the electrical charging components; and the first charger port being adapted to receive therein an electronic device and battery pack assembly for recharging the battery pack, the first closed end and the first lower electrodes adapted for supporting and recharging an electronic device and battery pack assembly of a predetermined size, and the first step and the first upper electrodes being adapted for supporting and recharging an electronic device and battery pack assembly of a different larger predetermined size.

8. The battery charger of claim 7 wherein, the first wall of the first charger port is sloped such that when an electronic device and battery pack assembly is received within the first charger port, the battery pack is forced into contact with either the first upper or first lower electrodes by a moment of inertia generated by the electronic device and battery pack assembly.

9. The battery charger of clam 7 further comprising:

a second opening in the outer surface defining a second charger port terminating at a second closed end within the housing;

a second wall extending between the second opening and the second closed end, the second wall having a second step formed thereon between the second opening and the second closed end;

second upper electrodes disposed on the second wall between the second opening and the second step and connected to the electrical charging components, and second lower electrodes disposed on the second wall between the second step and the second closed end and connected to the electrical charging components; and the second charger port being adapted to receive therein a battery pack for recharging, the second closed end and the second lower electrodes adapted for supporting and recharging a battery pack of a predetermined size, and the second step and the second upper electrodes being adapted for supporting and recharging a battery pack of a different larger predetermined size.

10. The battery charger of claim 9 wherein, the second wall of the second charger port is sloped such that when a battery pack is received within the second charger port, the battery pack is forced into contact with either the first upper or first lower electrodes by a moment of inertia generated by the battery pack.

11. The battery charger of claim 7 wherein, the outer surface of the housing is an upper surface generally opposite a bottom surface oriented generally parallel to a support surface on which the battery charger is placed.

* * * * *